US009243612B2

(12) United States Patent
Carretero Bueno

(10) Patent No.: US 9,243,612 B2
(45) Date of Patent: Jan. 26, 2016

(54) GENERATOR WITH VERTICAL PISTON AND RECIPROCAL MOVEMENT, WITH ORIENTABLE BLADES AND CONVERSION OF MECHANICAL ENERGY TO ELECTRICAL ENERGY BY MEANS OF A VERTICAL SOLENOID DEVICE

(71) Applicant: Rosario Carretero Bueno, Madrid (ES)

(72) Inventor: Rosario Carretero Bueno, Madrid (ES)

( * ) Notice: Subject to any disclaimer, the term of this patent is extended or adjusted under 35 U.S.C. 154(b) by 0 days.

(21) Appl. No.: 14/381,603

(22) PCT Filed: Apr. 3, 2013

(86) PCT No.: PCT/IB2013/000592
§ 371 (c)(1),
(2) Date: Dec. 3, 2014

(87) PCT Pub. No.: WO2013/132333
PCT Pub. Date: Sep. 12, 2013

(65) Prior Publication Data
US 2015/0176565 A1    Jun. 25, 2015

(30) Foreign Application Priority Data
Mar. 9, 2012    (ES) .................................. 201200275

(51) Int. Cl.
*F03D 5/06*    (2006.01)
*F03B 17/06*    (2006.01)
*F03D 9/00*    (2006.01)

(52) U.S. Cl.
CPC . *F03D 5/06* (2013.01); *F03B 17/06* (2013.01); *F03D 9/002* (2013.01); *F05B 2220/707* (2013.01); *Y02E 10/70* (2013.01)

(58) Field of Classification Search
CPC ........... F03D 5/06; F03D 9/002; F03D 3/005; F03D 3/067; F03B 17/06; F03B 17/025
See application file for complete search history.

(56) References Cited

U.S. PATENT DOCUMENTS

| | | | | | |
|---|---|---|---|---|---|
| 3,696,251 | A | * | 10/1972 | Last et al. ...................... | 290/53 |
| 3,995,972 | A | * | 12/1976 | Nassar ............................ | 416/68 |
| 4,595,336 | A | * | 6/1986 | Grose ............................. | 416/82 |
| 4,915,584 | A | * | 4/1990 | Kashubara ...................... | 416/64 |
| 2002/0162326 | A1 | * | 11/2002 | Brumfield ...................... | 60/398 |
| 2007/0228736 | A1 | * | 10/2007 | Smushkovich ................. | 290/42 |
| 2009/0224553 | A1 | * | 9/2009 | Williams ........................ | 290/55 |

(Continued)

FOREIGN PATENT DOCUMENTS

| | | |
|---|---|---|
| ES | 1063482 U | 11/2006 |
| WO | 2009115253 | 9/2009 |

*Primary Examiner* — Tulsidas C Patel
*Assistant Examiner* — Viet Nguyen
(74) *Attorney, Agent, or Firm* — Mark M. Friedman

(57) ABSTRACT

A generator with a vertically reciprocating piston, including: a cylindrical head defining an inner space and having mounted on an inner surface thereof: a solenoid defining an internal space, an upper rack, and a lower rack; a piston including: an upper part extending out of the head, and a lower part moveable within the inner space of the head, the piston adapted to move in a vertical, reciprocal movement under a force of fluid impacting airfoil blades coupled to the upper part of the piston, wherein at least two of the airfoil blades are each coupled to the piston. The lower part of the piston includes a series of magnets, and the vertically reciprocating motion of the piston causes the series of magnets to move in the vertically reciprocating motion within the internal space defined by the solenoid, so as to generate energy.

5 Claims, 4 Drawing Sheets

(56) References Cited

U.S. PATENT DOCUMENTS

| | | | |
|---|---|---|---|
| 2010/0034670 A1* | 2/2010 | Smith | 417/53 |
| 2010/0117367 A1* | 5/2010 | Muller et al. | 290/53 |
| 2010/0213718 A1* | 8/2010 | Kelly | 290/55 |
| 2010/0320765 A1* | 12/2010 | Folchert et al. | 290/53 |
| 2011/0064576 A1* | 3/2011 | Liu | 416/82 |
| 2011/0193347 A1* | 8/2011 | Leijon et al. | 290/53 |
| 2011/0258997 A1* | 10/2011 | Kelly | 60/497 |
| 2012/0074702 A1* | 3/2012 | Ahdoot | 290/53 |
| 2012/0171035 A1* | 7/2012 | Fransen | 416/17 |
| 2012/0235417 A1* | 9/2012 | Arntz | 290/55 |
| 2013/0008157 A1* | 1/2013 | Zuo et al. | 60/497 |
| 2013/0078097 A1* | 3/2013 | Milanese et al. | 416/170 R |

* cited by examiner

GENERATOR WITH VERTICAL PISTON AND RECIPROCAL MOVEMENT, WITH ORIENTABLE BLADES AND CONVERSION OF MECHANICAL ENERGY TO ELECTRICAL ENERGY BY MEANS OF A VERTICAL SOLENOID DEVICE

OBJECT OF THE INVENTION

Present invention refers to a new type of generator that takes advantage of the movement of a fluid (air or water), for obtaining electrical power. The incident flow of fluid (air or water), affects multiple blades with a variable inclination special profile, producing a vertical force whose direction is alternately upward and downward force. This alternative force causes the reciprocal movement of a piston, concentric to the main generator.

The piston has a series of magnets inside, which move longitudinally relative to the shaft, which incorporates a solenoid in the internal part of its structure.

The relative motion of magnets and solenoid produces an electromotive force and generates an electrical potential that is collected at the terminals of the solenoid for later use.

FIELD AND BACKGROUND OF THE INVENTION

The invention presented affects Mechanics Section of the International Classification of Patents, chapter of engines and pumps with regard to Wind or Hydraulic Motors Shaping, from the industrial perspective, in the manufacture of Special Generators and its Accessories. There are horizontal and vertical axes wind generators with different engine technologies, types of rotor and wings.

As for those of vertical axis, there are several records with one or more rotors, rotor blades movable in height, rotor with optimized orientation blades, blades with variable structure, multiplier devices, permanent magnet motor, starters with weak wind and many other.

The same can be applying to the horizontal axis that, today are the most widespread in wind power generation plants with highly developed technology.

However, there are no relevant development devices based on what is proposed by the inventor, what constitutes an innovation in this field with the corresponding advantages on existing turbines principles devices.

SUMMARY OF PRESENT INVENTION

Present invention relates to a new type of generator which takes advantage of the movement of a fluid (air or water) for obtaining electrical energy (power).

Basically, it consists of a column that constitutes the main shaft bearing structure of the generator device. This structure with its corresponding base can brace with a series of straps to assure its stability.

In the top of a swivel, on a vertical shaft bearing that allows the automatic orientation of the generator in the optimum direction for the best utilization of the wind or hydraulic power.

The mentioned rotating head includes in turn cylindrical body that is movable in vertical direction as a plunger so that the movement is alternately upwards and downwards. The force that drives the piston is generated by the air or water incidence over a group of aerofoil blades rotatable about a horizontal axis. When the blades are oriented such that the fluid impinges on the bottom surface, the resultant force is upward. Conversely (On the contrary), when the blades show their superior air or water stream face, the movement is downward.

The resulting driving force, up or down, depends on the angle of incidence, with the understanding that the gravity intensifies downward forces and vice versa.

The change in the orientation of the blades is achieved through a mechanism gear and pinion transmission type crank connecting rod, whose operation is easily deduced from the figures incorporated herein as an integral part of this document.

The power generation is achieved by relative reciprocation of series of neodymium magnets, or otherwise, incorporated into the moving cylinder, compared to a solenoid type coil installed in the head.

Present invention allows to achieve significant cost savings relative to existing rotary models currently on the market, both horizontal and vertical axis. The proposed model is lighter than the traditional and the distribution of mechanical forces in the most homogeneous elements, decreasing costs, both of the active part of the team (with lower specific weight with regard to the rotating models), and the shaft and foundations, which are sized for a lighter mobile structure than the usual rotating models of horizontal or vertical axis and also allowing the use of an easy way of a cable-stayed shaft, whose use is more restricted in traditional generators because interference in the rotating rotor straps. The low mechanical requirements make the device capable of being installed without civil works, using prefabricated slabs and foundations.

The figures included below facilitate understanding of the invention, showing the most significant details thereof.

BRIEF DESCRIPTION OF THE DRAWINGS

Four embodiments are herein described, by way of example only, with reference to the accompanying drawings, wherein.

Figure 1:
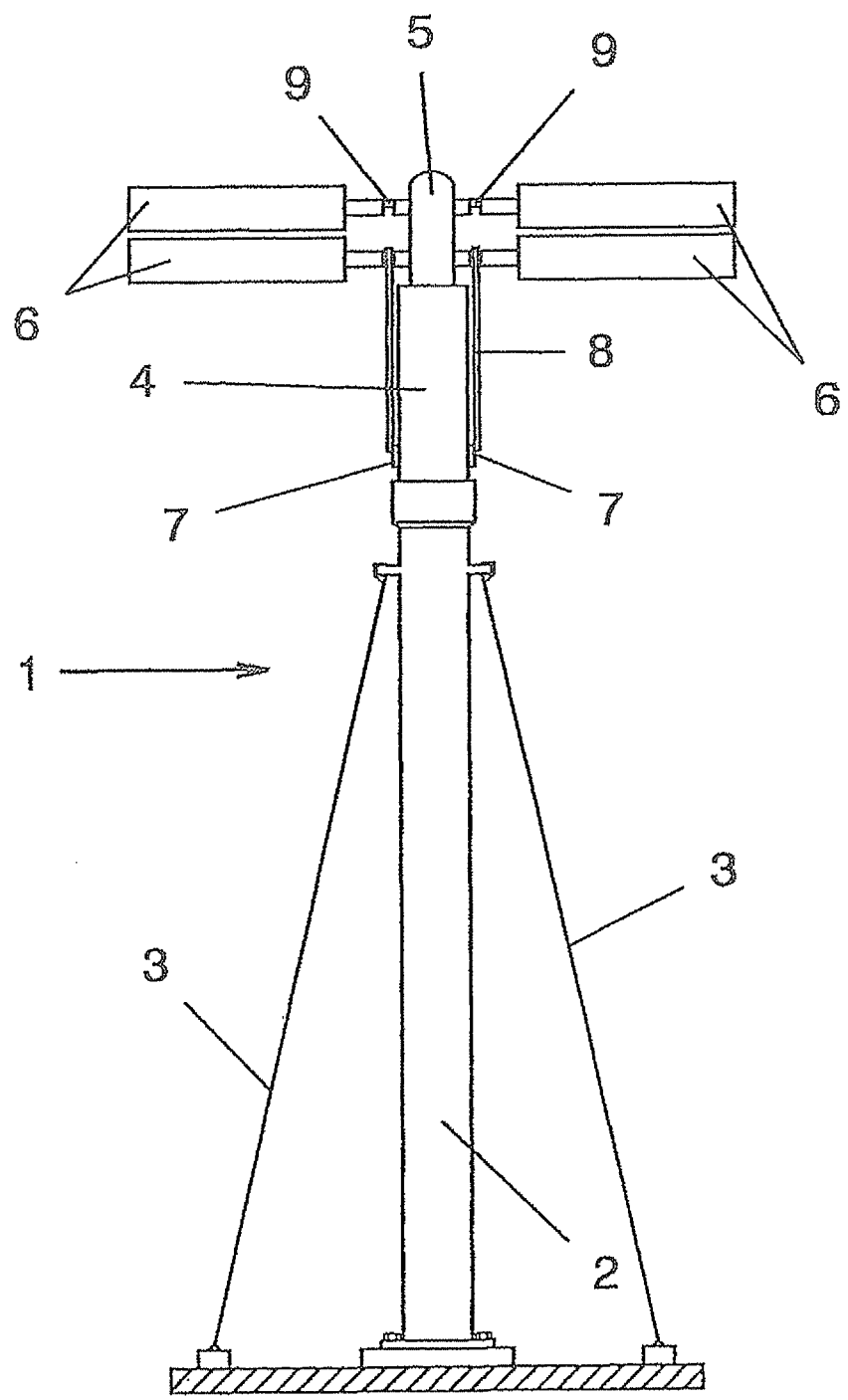
FIG. 1: Is a plan view of the generator, which is shown in an assembly view where the main parts can be distinguished. The following elements have been identified:
1. Generator
2. Shaft
3. Strap
4. Head
5. Piston
6. Blades
7. Cams
8. Connecting rod
9. Crankshaft
Figure 2:
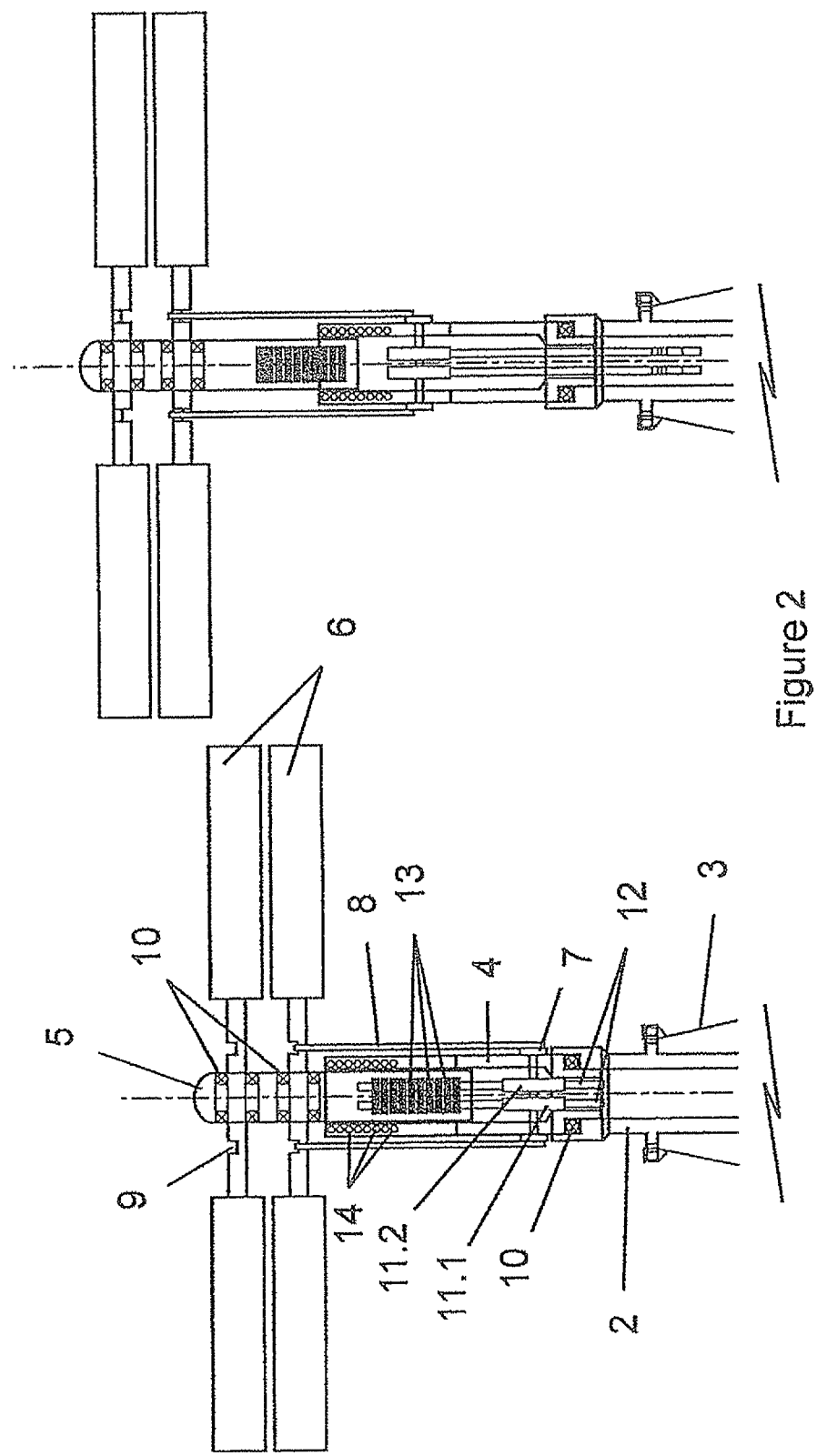
FIG. 2: In this figure, the generator is represented in two different piston positions, the left one shows the bottom position and the right one the top end position. In addition to the elements of the previous figure, the following are listed:
10. Bearing
11.1. Ascent Gear
11.2. Descent Gear
12. Bars
13. Magnet
14. Solenoid FIG. 3 This figure depicts the generator with its piston in the bottom position and a side view detailing the mechanism for switching the position of the blades when the stroke is completed in the bottom. Gear and rack are drawn on the left side view. On the right side view is drawn a sprocket, which in this case descent inactive in "free wheel" operation.
Figure 3:
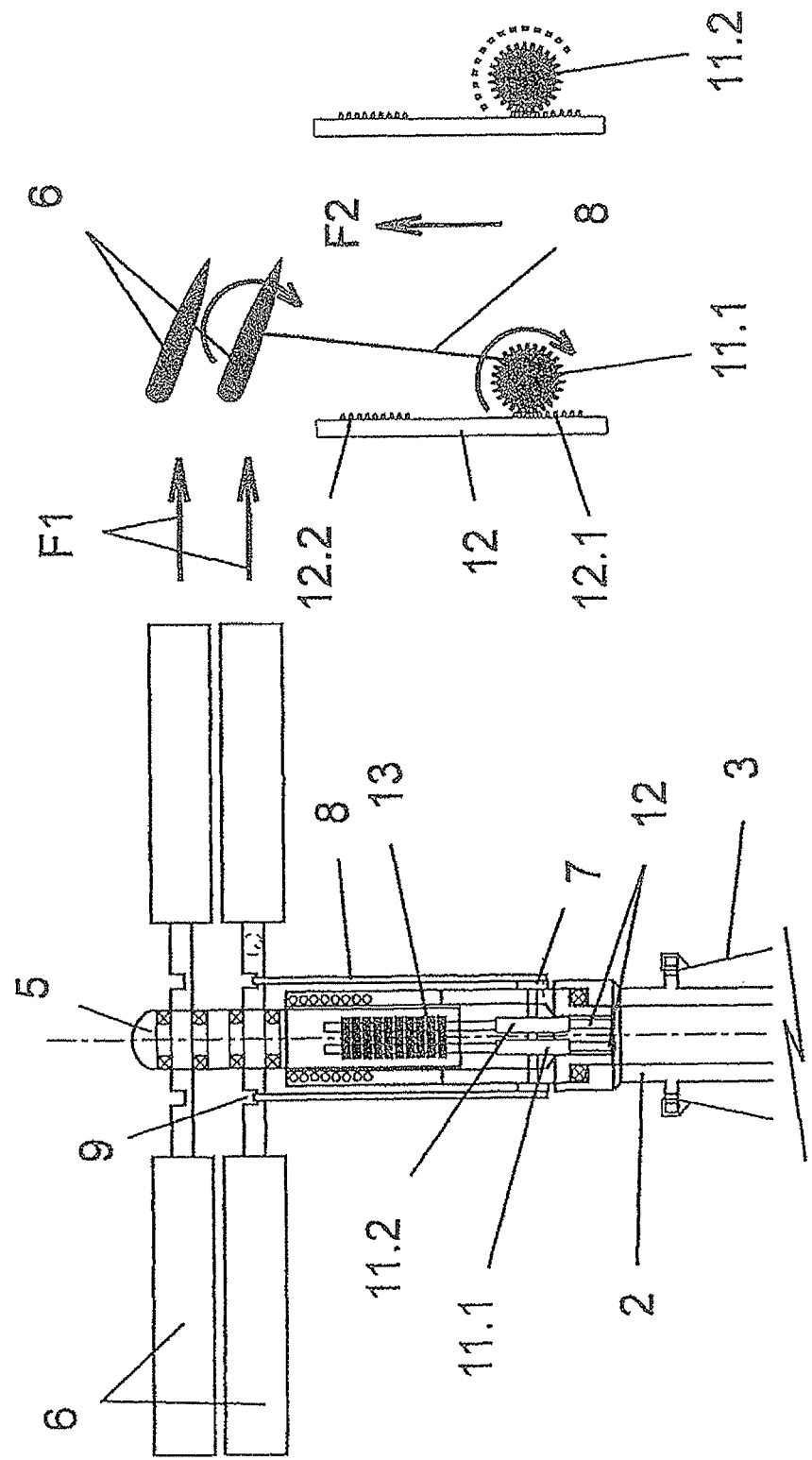
Figure 4:
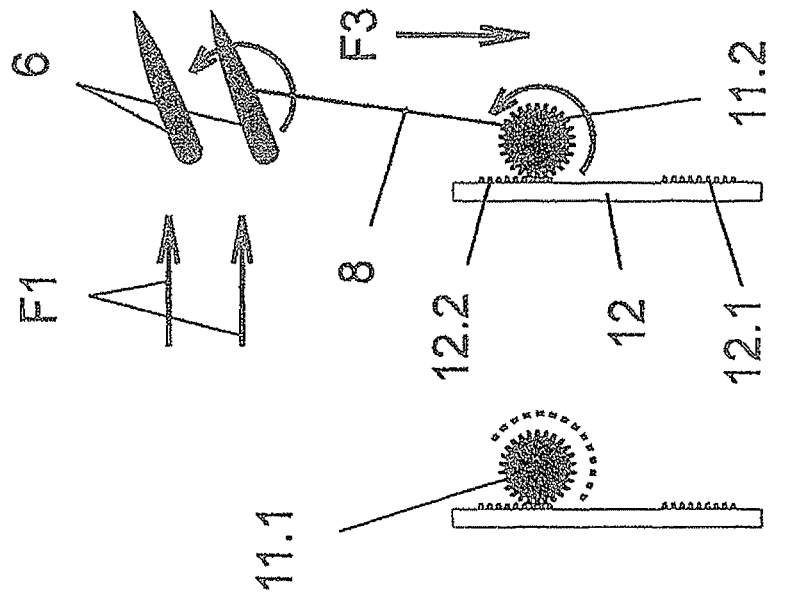
Figure 4:
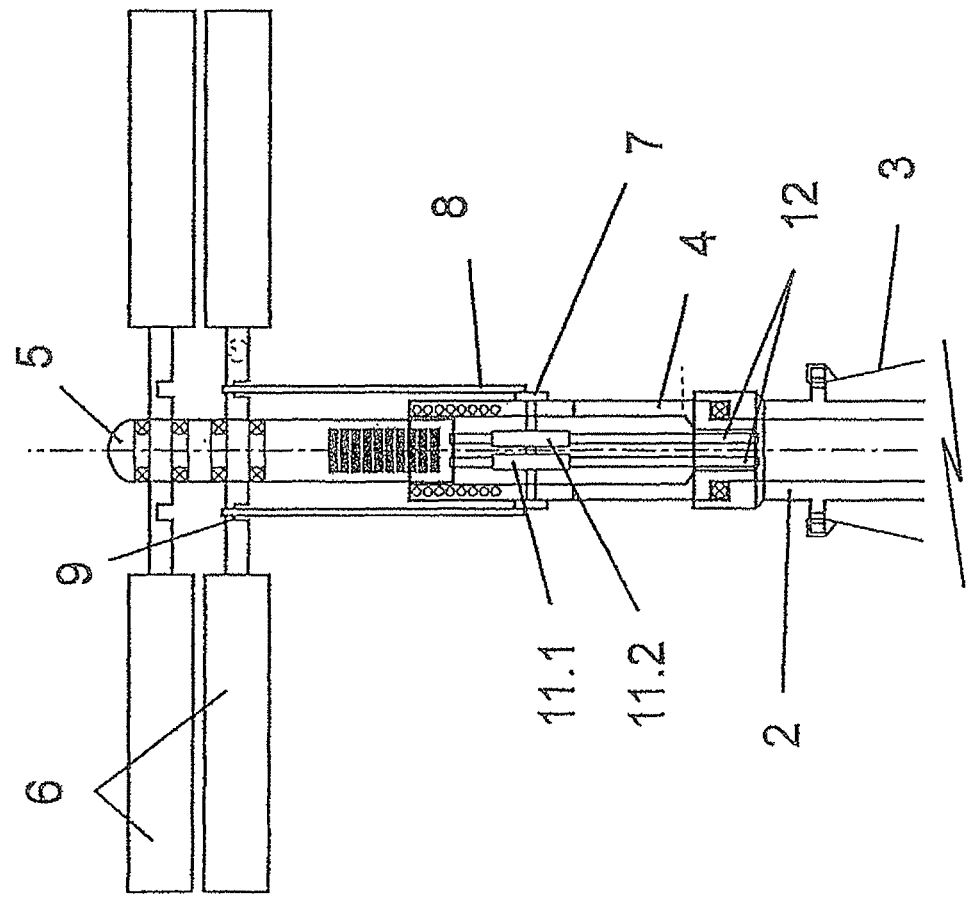

States the following:
12.1 Bottom rack
12.2 Top rack
F1 Wind force
F2 Ascendant force FIG. 4 This figure depicts the generator with its piston in the upper position and a side view detailing the mechanism that allows to switch wings position when the upstroke is completed. Gear and rack are drawn on the left side view. On the right side view is drawn a sprocket, which in this case ascents inactive in "free wheel" operation.

States the following:
F3 Falling force

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The generator of vertical piston and alternative displacement, with adjustable spades and conversion of the mechanical energy in electrical across a vertical device solenoidal (1) (FIGS. 1, 2, 3 and 4), it is a machine that uses the kinetic energy of a fluid (air or water) to obtain electric power.

According to a preferred embodiment of the inventor, comprises a shaft (2) which constitutes the supporting structure of the generator (1,) which is supported and bolted onto a concrete base and secured by straps (3), which provide stability. At the shaft top (2), a head (4) about a vertical axis, which enables the automatic orientation of the generator in the optimum direction for the best use of the energy transmitted by wind or water movement is coupled natural.

Quoted head (4), rotating a cylindrical body includes movable vertically acting as a piston (5) for upward and downward reciprocating movement. The driving force of the piston (5) is generated by air or water impact on a group of blades (6) or aerofoil flaps rotatable about a horizontal axis. If the blades (6) are oriented such that the fluid impinges on the bottom blade surface, the resultant force is upward. In the opposite situation in which the blades (6) show superior to the air stream or water side, the resulting force is vertical and down causing a downward movement.

The resulting driving force upwards or downwards, is more or less, depending on the angle of incidence, it is obvious that the force of gravity favor downward forces and counteract the upward.

As part of the rotating head (4), and being made integral with it, two vertical bars (12) (FIG. 2), whose ends are equipped with as lower rack (12.1) and upper rack (12.2) (FIGS. 3 and 4) and there is a free section of teeth. These two bars (12) parallel and oriented similarly, could be replaced by a single, of greater width, with identical zipper regions.

As part of the plunger (5) and moving integrally with it, there is a group of elements formed by a toothed wheel of ascent (11.1), a gear of descent (11.2), a common axis two wheels with cams (7) at its ends, two connecting rods (8), a series of blades (6) or flaps, of horizontal axis, fitted with crankshafts (9) and bearing (10).

Importantly sprocket decrease (11.2) is free to rotate on its axis in a sense being blocked on the same axis if you rotate counterclockwise. In terms sprocket decrease (11.2) has the same features with the particularity of being in opposition to each other, i.e., when the sprocket upgrade (11.1) is blocked, sprocket upgrade (11.1) turns free fall gearwheel is locked on the common axis.

Finally, the power team generation is basically formed by a series of neodymium magnets (13) solidly connected with the piston (5) and a solenoid (14) integral with the head (4).

The observation of (FIGS. 3 and 4) provides insight into the operation of the generator. If we start from a lower position of the piston (5), shown in (FIG. 3), we see that the blades (6) are oriented that the wind force (F1) impinges on the bottom, causing a push above represented by the lifting force (F2). Shortly before the piston (5) reaches the top position, as shown in (FIG. 4), lowering the sprocket (11.2) locked about its axis, engages the upper rack sector (12.2), spinning to the eccentric (7), in the opposite direction clockwise, pushing up to the rod (8) which requires the blades (6) also rotate in the opposite direction clockwise to push the corresponding crankshaft (9).

For the reason given above, sprocket upgrade (11.1) turns freely and does not exert any action. The blades (6) have been oriented to offering superior wind force (11) face at the piston (5) begins his descent down hard (F3).

Likewise, shortly before the plunger (5) reaches the lowest position shown in (FIG. 3) promotion sprocket (11.1), locked on the shaft, meshing with the rack bottom sector (12.1), rotating the eccentric (7) in the direction of clockwise, pulling down the rod (8) which requires the blades (6) to also rotate clockwise crankshaft driven by the corresponding (9). Decrease sprocket (11.2) turns crazy and does not exert any action. The blades (6) have been oriented for providing its lower wind force (F1) face at the piston (5) begins its climb tackles (F2).

It is easily understood that when the gears are moved by exempt sections of bar teeth (12) can be no interaction between wheels and zippers.

Stroke alternate magnets (13) from the solenoid (14), generates electric power capable of being captured, processed, transmitted, and used for different purposes.

It is not considered necessary to extend the description contents for an expert in the art to understand the scope and advantages of the invention, and to develop and practice to weigh the object.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A generator with a vertically reciprocating piston, the generator comprising:
   (a) a cylindrical head mounted on a shaft, said head defining an inner space and having mounted on an inner surface thereof:
      (i) a solenoid, said solenoid defining an internal space,
      (ii) an upper rack, and
      (iii) a lower rack;
   (b) a piston, said piston including:
      (i) an upper part extending out of said head, and
      (ii) a lower part moveable within said inner space of said head, said piston adapted to move in a vertical, reciprocal movement under a force of fluid impacting a plurality of airfoil blades operationally coupled together and operationally coupled to said upper part of said piston, wherein at least two of said plurality of airfoil blades are each operationally coupled to said piston via a horizontal shaft defining a horizontal axis about which said blade is adapted to rotate, wherein a portion of said horizontal shaft includes a crankshaft, and wherein said lower part of said piston includes a series of magnets, such that said vertically reciprocating motion of said piston causes said series of magnets to move in said vertically reciprocating motion within said internal space defined by said solenoid, so as to generate energy; and (c) a geared mechanism for changing an orientation of said group of airfoil blades, said geared mechanism comprising:
  (i) a toothed sprocket ascent gear and a toothed sprocket descent gear having a common axis,
  (ii) cams mounted on each end of said common axis,
  (iii) two connecting rods, said connecting rods coupling said cams to said crankshafts;

wherein said airfoil blades have a downwards orientation such that said force of fluid impacts an underside of said airfoil blades causing said blades and said piston to rise to an upper position relative to said head and an upwards orientation such that said force of fluid impacts a topside of said airfoil blades and/or a force of gravity causes said blades and said piston to descend to a lower position; and wherein when said piston approaches said upper position, said descent gear engages said upper rack causing said cams and connecting rods to rotate said blades from said downwards orientation to said upwards orientation, and when said piston approaches said lower position, said ascent gear engages said lower rack causing said cams and connecting rods to rotate said blades from said upwards orientation to said downwards orientation.

2. The generator of claim 1, wherein the ascent gear (11.1) is adapted to rotate said cams in a first direction and rotate freely about said common axis in a second direction and said descent gear (11.2) is adapted to rotate said cams said second direction and rotate freely about said common axis in said first direction, wherein said first direction is opposite to said second direction.

3. The generator of claim 1, wherein between the lower rack (12.1) and the upper rack (12.2) the is provided one linear section free of teeth.

4. The generator of claim 1, wherein the generator it is able to function as a hydro or wind turbine.

5. The generator of claim 1, wherein said magnets are selected from the group including: compound neodymium magnets and permanent magnets other than said compound neodymium magnets.

* * * * *